Aug. 8, 1961     E. W. SODERBERG     2,995,265
SPOON
Filed July 29, 1958
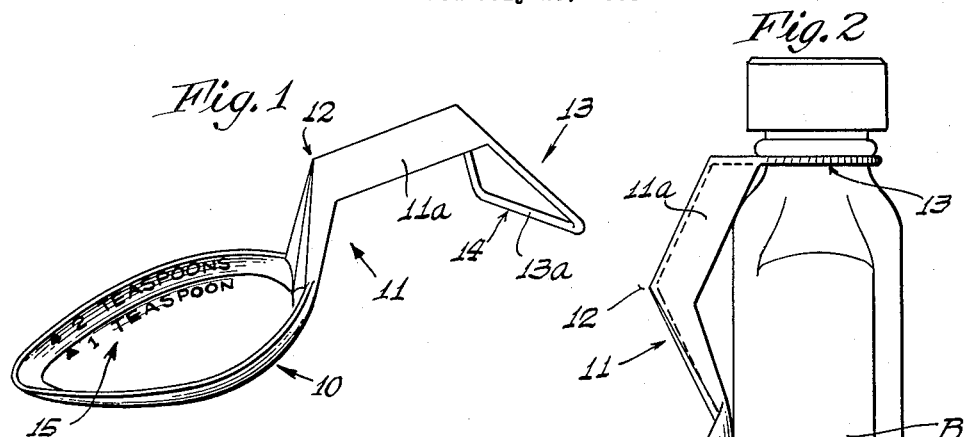
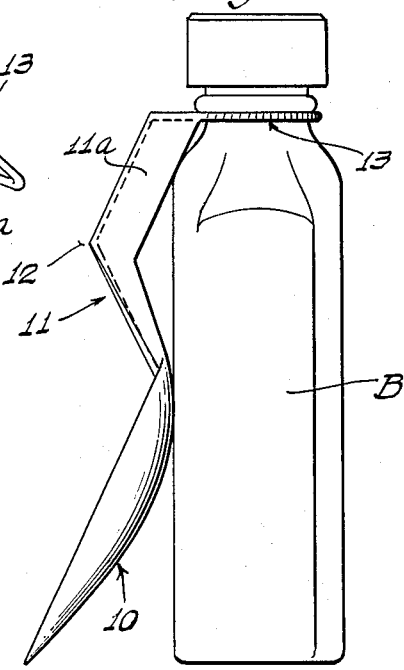
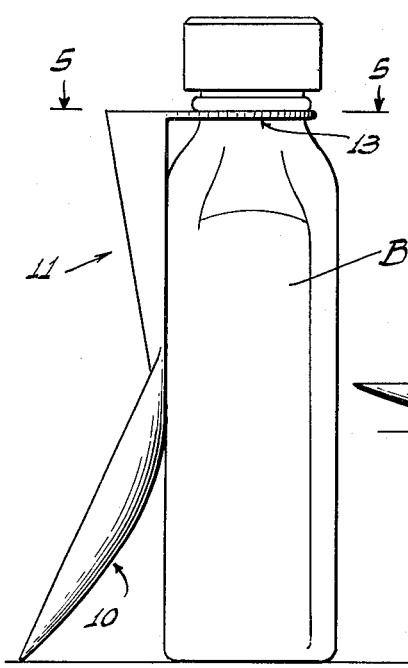
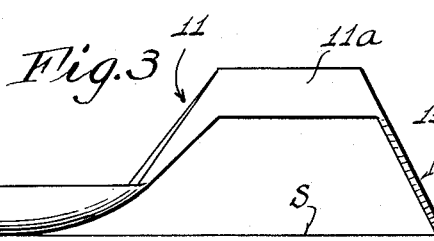
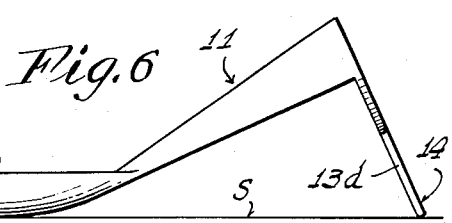
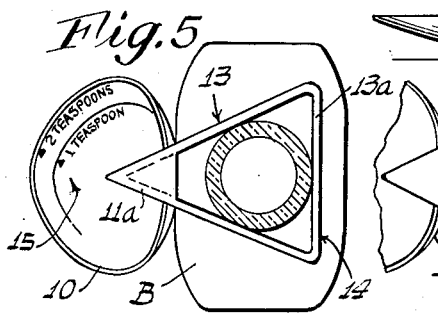
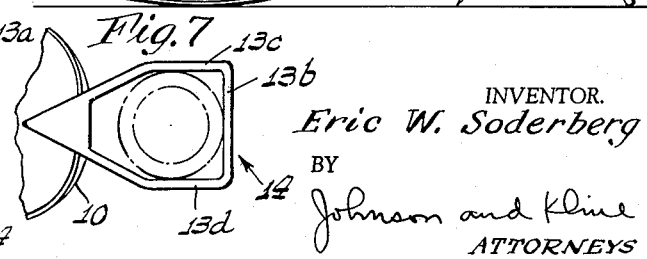
INVENTOR.
Eric W. Soderberg
BY Johnson and Kline
ATTORNEYS

United States Patent Office 2,995,265
Patented Aug. 8, 1961

2,995,265
SPOON
Eric W. Soderberg, Milford, Conn., assignor to Newburgh Molded Products, Inc., Newburgh, N.Y., a corporation of New York.
Filed June 29, 1958, Ser. No. 751,729
6 Claims. (Cl. 215—100)

This invention relates to a spoon, and more particularly to a spoon adapted to be detachably connected to a bottle and to be used in dispensing material contained in said bottle.

It is an object of the invention to provide a spoon of simple construction which can be effectively associated with a bottle during storage so as to be readily available when it is desired to dispense material from said bottle.

It is another object of the invention to provide a spoon having the means for connecting the spoon to the bottle so formed as to facilitate supporting of the spoon in position to receive material from the bottle.

It is a further object of the invention to provide a spoon which can be readily molded or formed into an inexpensive spoon which may be used as a "give-away" item which can be readily disposed of when it is no longer needed.

Other features and advantages of the invention will be apparent from the specification and claims when considered in connection with the accompanying drawings in which:

FIGURE 1 is a perspective of one form of the spoon of the present invention.

FIG. 2 shows the spoon of FIG. 1 associated with a bottle.

FIG. 3 is a side elevational view showing the spoon of FIG. 1 supported on a surface to receive material therein.

FIG. 4 is a view of another form of the invention mounted on a bottle.

FIG. 5 is a view taken along line 5—5 of FIG. 4.

FIG. 6 is a view of the form of spoon of FIG. 5 having a different form of loop.

FIG. 7 is a partial end view of the spoon of FIG. 6 showing the loop of FIG. 6.

As shown in the drawings, the spoon of the present invention comprises a bowl 10 which preferably has a rounded bottom and is adapted to receive and hold material. Projecting upwardly and rearwardly from the bowl is a handle 11. While the handle may be connected to the bowl in various ways, in the preferred and illustrated form of the invention it extends upwardly from one end of the bowl at an angle to the plane of the top of the bowl so as to make an obtuse angle therewith.

In the form of the invention shown in FIG. 1, the handle is provided with a bend or deflection indicated at 12 so that the portion 11a extends substantially parallel to the plane of the top of the bowl while in the form of the invention shown in FIGS. 4 and 5, the handle 11 extends upwardly at an angle from the bowl for the full length thereof and is not provided with any horizontal portion as in FIG. 1. The handle has at the end thereof a closed loop 13 depending therefrom. In the illustrated form of the invention the loop lies in a plane transverse to the axis of the handle to which it is secured. The loop is of such size and shape as to be positioned around the neck of a bottle or the like B, as shown in FIG. 2, so that the spoon may be supported thereon preferably in depending relation with the bowl engaging the side of the bottle and may be readily removed therefrom for use.

While the spoon may be used for dispensing many types of materials, it is particularly useful in connection with liquids which are usually dispensed by the spoonful such as pharmaceuticals, flavoring extracts and the like and with various types of granular material. When it is desired to dispense the material, the spoon is removed from the bottle by having the loop preferably formed of resilient material which can be snapped off from over the neck and may be held in the hand by the handle 11 while the material is poured from the bottle into the bowl or the spoon may be supported on a supporting surface S, as shown in FIG. 3, with the bowl in a horizontal position to receive the material. To facilitate this latter operation the closed loop is provided with a support engaging means 14 adapted to engage the supporting surface and stabilize the spoon thereon. While this means may take many forms, in the herein illustrated form of the invention the loop 13 is formed with a flat bottom surface 13a which is adapted to engage the supporting surface and prevent the spoon from tipping sideways as the material is poured therein.

In the form of the invention shown in FIGS. 1–5, the loop is triangular in shape and has its apex connected to the handle with the base of the triangle forming a flat bottom surface 13a for engaging the supporting surface. As shown, the sides of the triangle are relatively thin. By bowing the sides outwardly, the loop can be caused to snap into position around the neck as shown in FIGS. 2, 4 and 5. In the form of the invention shown in FIGS. 6 and 7, the loop is formed with a squared portion comprising the base 13b, which forms the supporting means 14 and is narrower than the triangular base 13a, and parallel side walls 13c, 13d. This squared portion will engage the sides of the neck as shown in FIG. 7 and hold the spoon in position and can be bowed to permit the spoon to be snapped on or off the bottle.

If desired, the spoon can be provided with indicia 15 to indicate quantities of material contained in the spoon as shown in FIG. 1.

While the spoon of the present invention can be made of metal or fibrous material which can be formed into a relatively light self-sustaining unit, it is at present preferred to form the spoon of a molded thermoplastic or thermosetting material and of thin walled construction. The handle can be provided with sufficient rigidity for supporting the bowl by being formed as a channel-shaped member as shown in dotted lines in FIG. 5. The plastic material, of course, will be sufficiently resilient to permit the loop to snap into position. Such a spoon would be relatively inexpensive to manufacture and can be discarded after the contents of the bottle has been dispensed.

Not only does the spoon of the present invention have the advantage of being attachable to the bottle so as to always be available for use when needed but it has an additional advantage in that it can be made at sufficiently low cost so as to be a "give-away" or premium item which can be readily made available to be disposed of when the bottle is empty.

A further advantage resides in the fact that it can be associated with the bottle at the factory and sealed in a sterile container and be ready for use by the purchaser without further precaution.

Variations and modifications may be made within the scope of the claims and portions of the improvements may be used without others.

I claim:

1. A spoon for use in dispensing bottled materials comprising a bowl having a rounded bottom and a planar top edge, an elongate handle at one end of the bowl projecting above the plane of the top of the bowl, and a closed depending resilient loop having a flat bottom portion secured to the other end of the handle, said flat bottom lying in a plane which is tangent to said rounded bottom and which plane is parallel to the said plane of the top edge, the resiliency of the loop enabling the loop to be snapped over a mouth of the bottle and into gripping relation with a neck portion of the bottle to detachably support the spoon thereon, said flat bottom portion being engageable with a support to hold the bowl of the spoon when removed from the bottle and rested on said support in a horizontal material-receiving position.

2. The invention as defined in claim 1 wherein the closed loop is triangular in shape.

3. The invention as defined in claim 1 wherein the handle is V-shaped in cross-section with the apex of the V pointing in the upward direction when the spoon is on the support.

4. The invention as defined in claim 1 wherein the closed loop is provided with a squared portion.

5. The invention as defined in claim 1 wherein the end of the handle adjacent the bowl forms an obtuse angle with the plane of the top of the bowl.

6. The invention as defined in claim 5 wherein the handle remote from the bowl is disposed in a plane above and substantially parallel to the plane of the top of the bowl.

References Cited in the file of this patent

UNITED STATES PATENTS

| | | |
|---|---|---|
| 1,618,189 | Hansen | Feb. 22, 1927 |
| 1,619,878 | Morgan et al. | Mar. 8, 1927 |
| 1,784,880 | Phillipson | Dec. 16, 1930 |
| 2,165,045 | Garside | July 4, 1939 |
| 2,576,388 | Claplin | Nov. 27, 1951 |